United States Patent
Harper et al.

(10) Patent No.: US 10,078,632 B2
(45) Date of Patent: Sep. 18, 2018

(54) COLLECTING TRAINING DATA USING ANOMALY DETECTION

(71) Applicant: International Business Machines Corporation, Armonk, NY (US)

(72) Inventors: Devin R. Harper, Denver, CO (US); Pawan K. Lakshmanan, Denver, CO (US); Gregory W. Schoeninger, Denver, CO (US); Elliot B. Turner, Denver, CO (US)

(73) Assignee: International Business Machines Corporation, Armonk, NY (US)

( * ) Notice: Subject to any disclaimer, the term of this patent is extended or adjusted under 35 U.S.C. 154(b) by 38 days.

(21) Appl. No.: 15/068,545

(22) Filed: Mar. 12, 2016

(65) Prior Publication Data

US 2017/0262429 A1    Sep. 14, 2017

(51) Int. Cl.
G06F 17/27 (2006.01)
G06F 17/28 (2006.01)

(52) U.S. Cl.
CPC ........ G06F 17/2775 (2013.01); G06F 17/274 (2013.01); G06F 17/28 (2013.01)

(58) Field of Classification Search
CPC ...................................................... G06F 17/27
USPC ............... 704/9; 725/46, 116; 715/273, 230; 709/203
See application file for complete search history.

(56) References Cited

U.S. PATENT DOCUMENTS

| | | | |
|---|---|---|---|
| 5,519,608 A * | 5/1996 | Kupiec | G06F 17/3064 704/9 |
| 6,029,195 A * | 2/2000 | Herz | G06F 17/30867 348/E7.056 |
| 6,510,406 B1 * | 1/2003 | Marchisio | G06F 17/2715 704/9 |
| 8,463,790 B1 * | 6/2013 | Joshi | G06F 17/30011 707/738 |
| 8,495,679 B2 * | 7/2013 | Labeeb | H04N 7/163 707/708 |
| 8,554,703 B1 * | 10/2013 | Lin | G06N 99/005 706/12 |
| 8,856,123 B1 * | 10/2014 | Forman | G06F 17/30613 706/12 |

(Continued)

OTHER PUBLICATIONS

Numenta, "The Science of Anomaly Detection, How HTM Enables Anomaly Detection in Streaming Data," White Paper, Numenta, Inc., 2014, 19 pages.

(Continued)

*Primary Examiner* — Michael Colucci
(74) *Attorney, Agent, or Firm* — VanLeeuwen & VanLeeuwen; William J. Stock

(57) ABSTRACT

An approach is provided in which an information handling system detects a multi-entity co-occurrence anomaly within a set of documents that corresponds to an amount of times that a first entity and a second entity co-occur in the set of documents. The information handling system then determines that at least one of the documents includes a title having a verb that grammatically connects the first entity to the second entity. As such, the information handling system collects document segments from the set of documents that have the first entity, the second entity, and the connecting verb. In turn, the information handling system uses the collected document segments to train a relation-based classifier.

20 Claims, 7 Drawing Sheets

(56) References Cited

U.S. PATENT DOCUMENTS

| | | | | |
|---|---|---|---|---|
| 8,977,613 B1* | 3/2015 | Cooke | | G06F 17/30867 707/732 |
| 8,983,970 B1* | 3/2015 | Osinga | | G06F 17/30728 707/748 |
| 9,235,653 B2* | 1/2016 | Talmon | | G06F 17/30958 |
| 2005/0108200 A1* | 5/2005 | Meik | | G06F 17/3071 |
| 2005/0278362 A1 | 12/2005 | Maren et al. | | |
| 2008/0109454 A1* | 5/2008 | Willse | | G06F 17/30616 |
| 2008/0148147 A1* | 6/2008 | Poston | | G06F 17/30716 715/273 |
| 2008/0168056 A1* | 7/2008 | Bluvband | | G06F 17/30648 |
| 2009/0070322 A1* | 3/2009 | Salvetti | | G06F 17/30616 |
| 2009/0276424 A1* | 11/2009 | Uchino | | G06F 17/30864 |
| 2011/0125837 A1* | 5/2011 | Hatami-Hanza | | G06F 17/30873 709/203 |
| 2011/0179084 A1* | 7/2011 | Waddington | | G06Q 30/02 707/794 |
| 2012/0011428 A1* | 1/2012 | Chisholm | | G06F 17/241 715/230 |
| 2012/0254188 A1* | 10/2012 | Koperski | | G06F 17/30663 707/740 |
| 2012/0288203 A1* | 11/2012 | Pan | | G06F 17/30253 382/190 |
| 2013/0212109 A1* | 8/2013 | Evancich | | G06Q 50/22 707/740 |
| 2014/0244676 A1* | 8/2014 | Byron | | G06F 17/2745 707/758 |
| 2015/0154509 A1* | 6/2015 | Lightner | | G06F 17/30011 706/12 |
| 2015/0235138 A1* | 8/2015 | Frieder | | G06N 5/041 706/46 |
| 2015/0331850 A1* | 11/2015 | Ramish | | G06F 17/2785 704/9 |
| 2016/0034457 A1* | 2/2016 | Bradley | | G06F 17/3043 707/749 |
| 2016/0140187 A1* | 5/2016 | Bae | | G06F 17/2785 707/722 |
| 2016/0147734 A1* | 5/2016 | Allen | | G06F 17/2775 704/9 |
| 2016/0253597 A1* | 9/2016 | Bhatt | | G06N 99/005 706/12 |
| 2017/0024443 A1* | 1/2017 | Dayan | | G06F 17/3043 |

OTHER PUBLICATIONS

Moraru et al., "D1.5 Trend and Anomaly Detection in Non-Structured Data," PlanetData, Network of Excellence, Seventh Framework Programme, FP7-257641, Sep. 2012, 29 pages.

* cited by examiner

COLLECTING TRAINING DATA USING ANOMALY DETECTION

BACKGROUND

The present disclosure relates to collecting relational training data to train a relation-based classifier by extracting document segments corresponding to multi-entity co-occurrence anomalies within source documents.

A question answer system answers questions posed in a natural language format by applying advanced natural language processing, information retrieval, knowledge representation, automated reasoning, and machine-learning technologies. Question answer systems differ from typical document search technologies because document search technologies return a list of documents ranked in order of relevance to a word query, whereas question answer systems receive a question expressed in a natural language, seeks to understand the question in much greater detail, and returns a precise answer to the question.

Question answer systems may perform relations extractions during the process of answering a question. A relations extraction system parses sentences into subject-verb-object (SVO) form and then may add additional semantic information such as entity extraction, keyword extraction, sentiment analysis and location identification. Relation extraction systems may also be used to automatically identify buying signals, key events and other actions important to a user.

Prior to using relations extraction systems, classifiers within the relations extractions systems require training. The classifiers train on training data that eventually allows the classifiers to determine "yes" answers from "no" answers during real-time use.

BRIEF SUMMARY

According to one embodiment of the present disclosure, an approach is provided in which an information handling system detects a multi-entity co-occurrence anomaly within a set of documents that corresponds to an amount of times that a first entity and a second entity co-occur in the set of documents. The information handling system then determines that at least one of the documents includes a title having a verb that grammatically connects the first entity to the second entity. As such, the information handling system collects document segments from the set of documents that have the first entity, the second entity, and the connecting verb. In turn, the information handling system uses the collected document segments to train a relation-based classifier.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
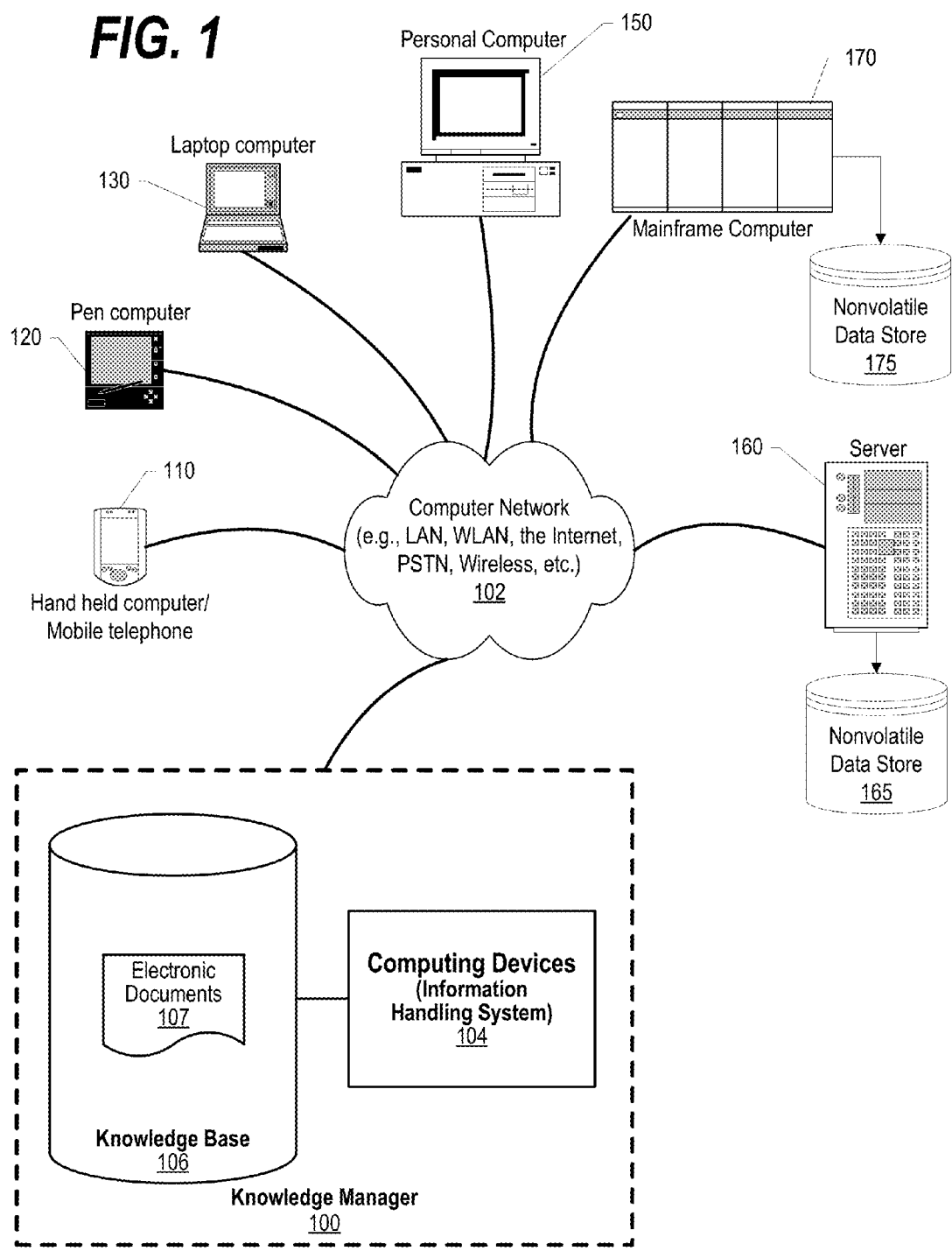
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 depicts a schematic diagram of one illustrative embodiment of a question/answer (QA) system knowledge manager 100 in a computer network 102. Knowledge manager 100 may include a computing device 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. Knowledge manager 100 and network 102 may enable question/answer (QA) generation functionality for one or more content users. Other embodiments of knowledge manager 100 may be used with components, systems, sub-systems, and/or devices other than those that are depicted herein.

Knowledge manager 100 may be configured to receive inputs from various sources. For example, knowledge manager 100 may receive input from the network 102, a corpus of electronic documents 107 or other data, a content creator 108, content users, and other possible sources of input. In one embodiment, some or all of the inputs to knowledge manager 100 may be routed through the network 102. The various computing devices 104 on the network 102 may include access points for content creators and content users. Some of the computing devices 104 may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured resource sources. In this manner, some processes populate the knowledge manager with the knowledge manager also including input interfaces to receive knowledge requests and respond accordingly.

In one embodiment, the content creator creates content in a document 107 for use as part of a corpus of data with knowledge manager 100. The document 107 may include any file, text, article, or source of data for use in knowledge manager 100. Content users may access knowledge manager 100 via a network connection or an Internet connection to the network 102, and may input questions to knowledge manager 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager. Knowledge manager 100 may interpret the question and provide a response to the content user containing one or more answers to the question. In some embodiments, knowledge manager 100 may provide a response to users in a ranked list of answers.

In some illustrative embodiments, knowledge manager 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize knowledge manager 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 100. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
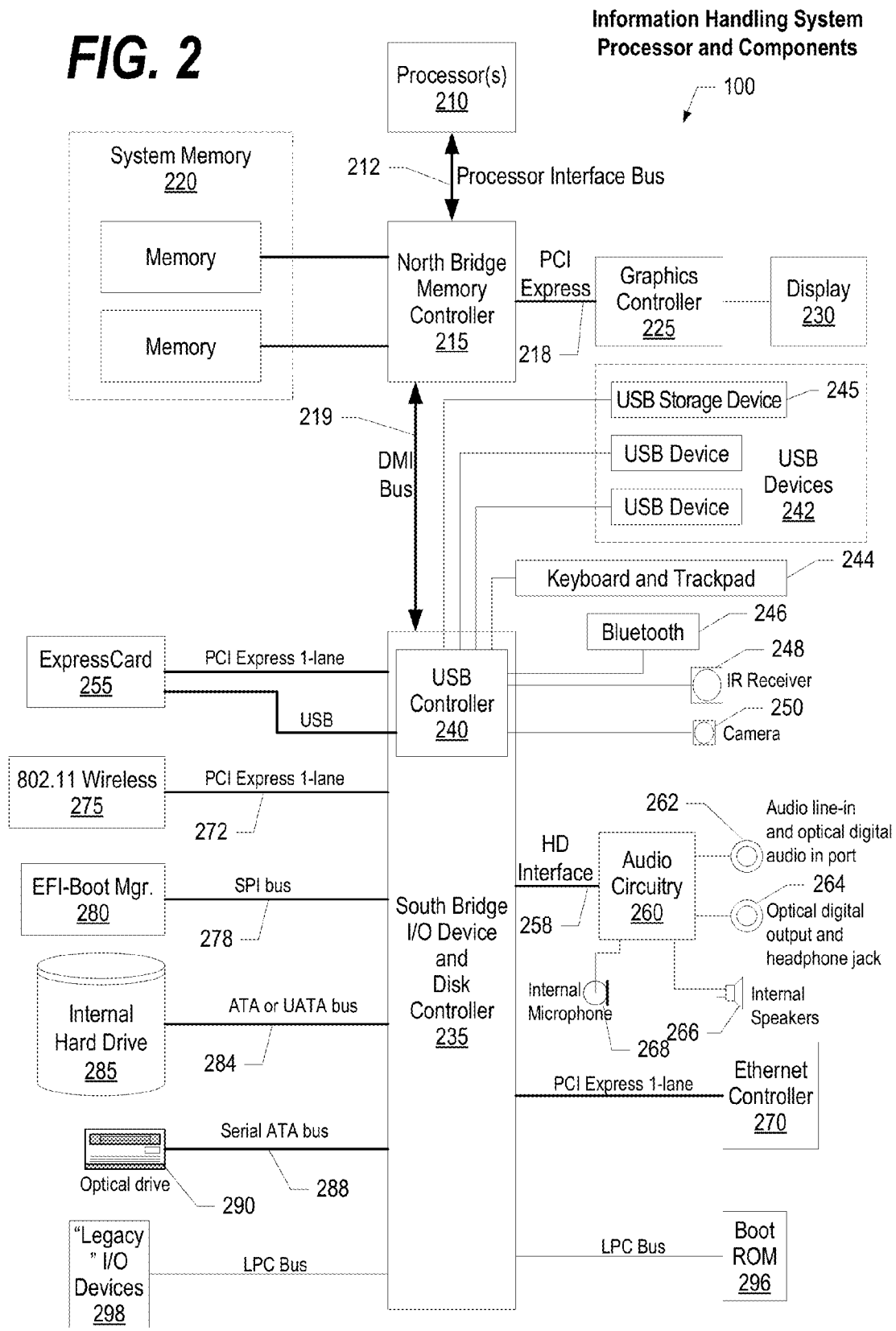
FIG. 2 provides an extension of the information handling system environment shown in FIG. 1 to illustrate that the methods described herein can be performed on a wide variety of information handling systems which operate in a networked environment.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE .802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIGS. 3 through 7 depict an approach that can be executed on an information handling system. The information handling system collects relational training data to train a relation-based classifier by detecting temporal anomalies of multi-entity co-occurrences within source documents. The information handling system determines an anomaly duration of multi-entity co-occurrences and checks whether a document title within the anomaly duration includes a verb that connects the multiple entities. If a document title exists that includes a connecting verb, the information handling system crawls documents corresponding to the anomaly duration and extracts document segments that include the multi-entities and connecting verbs. In turn, the extracted document segments are subsequently utilized to train a relation-based classifier.

Figure 3:
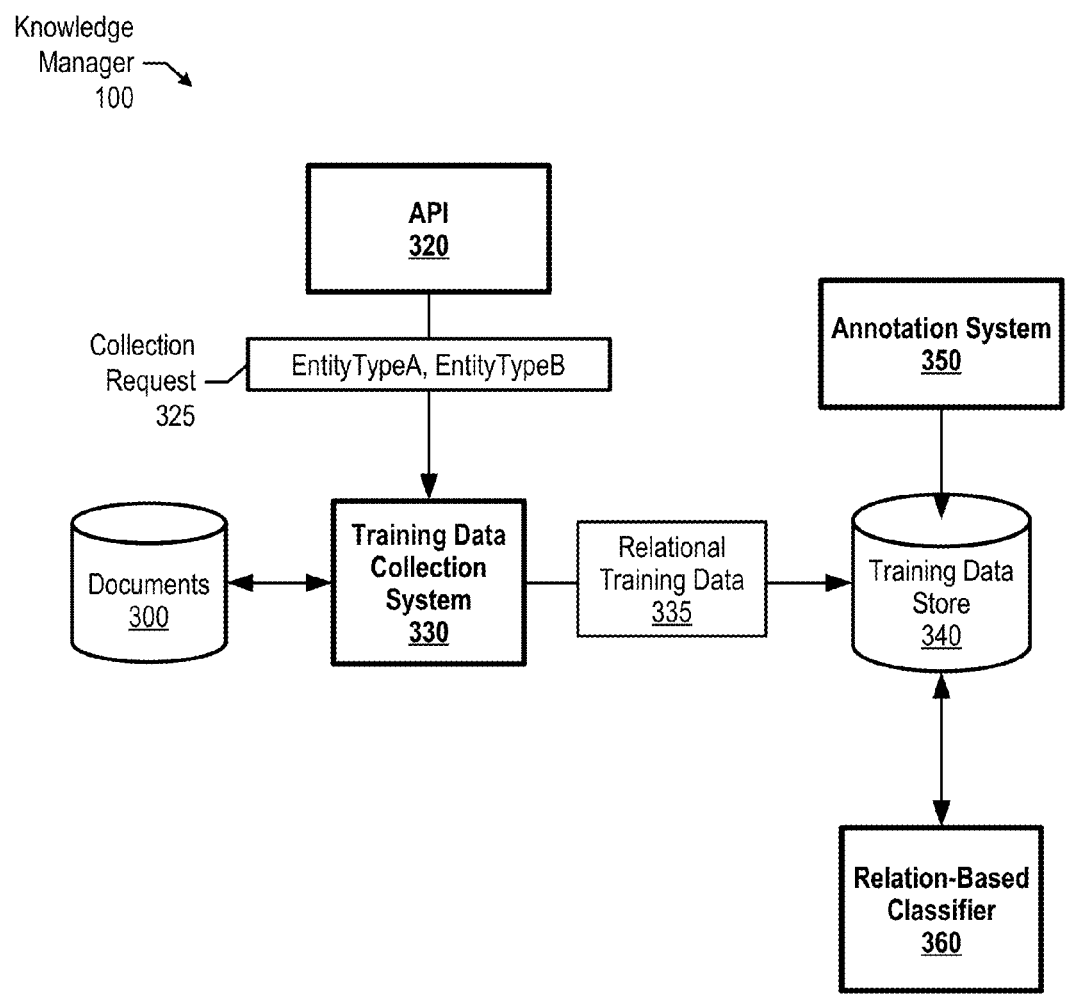
FIG. 3 is diagram depicting a training data collection system that collects relational training data from documents corresponding to multi-entity co-occurrence anomalies and uses the relational training data to train a relation-based classifier.

FIG. 3 is diagram depicting a training data collection system that collects relational training data from documents corresponding to multi-entity co-occurrence anomalies and uses the relational training data to train a relation-based classifier.

Documents 300 include a set of documents that have a time component, such as a set of news articles with time stamps (e.g., dates). In one embodiment, the set of documents are annotated with entity tags corresponding to entity names. In this embodiment, the entity tags may indicate an entity type such as "company," "person," "vehicle," etc.

Training data collection system 330 receives collection request 325 through API 320. Collection request 325 may include multiple entities for which training data collection system 330 is requested to identify temporal anomalies. The entities may be in the form of entity types (company, person, etc.), entity names (ACME corporation, Bill, etc.) or a combination of entity types and entity names. For example, if a user wished to collect training data corresponding to a particular company and any person, collection request 325 may include "ACME Corporation, person."

Figure 4:
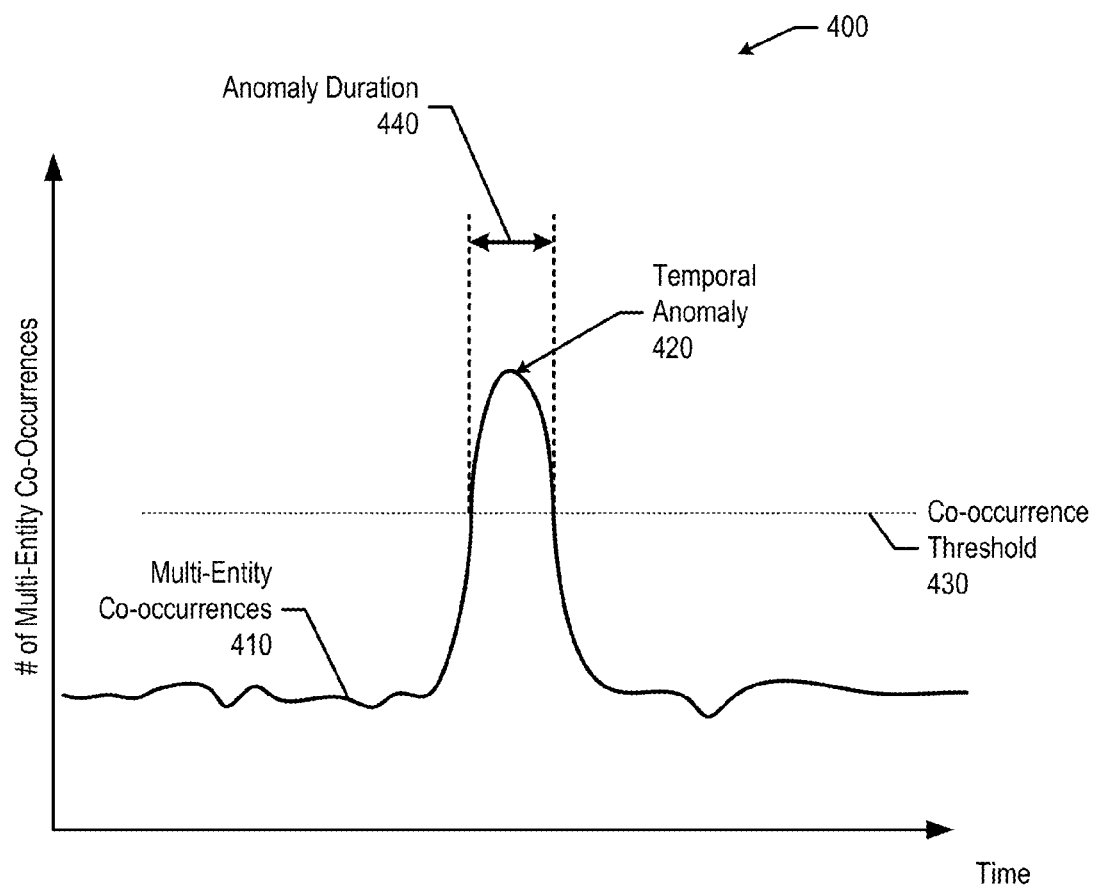
FIG. 4 is a graph depicting a temporal anomaly of multi-entity co-occurrences within a set of documents.

Training data collection system 330, in one embodiment, performs two key analysis steps to identify valid relational training data in documents 300. First, training data collection system 330 searches documents 300 for occurrences of both (or more) entities or entity types included in collection request 325 and evaluates the search results for multi-entity co-occurrence anomalies that exceed a threshold. Referring to FIG. 4, temporal anomaly shows that multi-entity co-occurrences 410 exceeds co-occurrence threshold 430 at a time period of anomaly duration 440. For example, company ABC may have acquired Company DEF and a numerous amount of news articles may have reported on the acquisition over a two-day period.

Second, to validate the anomaly, when training data collection system 300 has detected the multi-entity co-occurrence anomaly and determined the anomaly duration, training data collection system 300 checks titles of documents corresponding to the anomaly duration for verbs that connect the entities (entity name, entity type, or a combination thereof) in a Subject-Verb-Object (SVO) relation. For example, a document title may be "Company ABC acquires Company DEF." Referring to FIG. 5, documents 500 is included in anomaly duration 440, such as two days' worth of news articles, and training data collection system 300 checks titles 520 for verbs connecting the entities.

When training data collection system 300 validates the anomaly by identifying one or more titles that include an SVO relation, training data collection system 330 crawls the documents within the anomaly duration to identify each verb within the set of documents that connects the entity types, such as "acquire," "purchase," buys," etc. to obtain a comprehensive list of connecting verbs.

Training data collection system 330 selects a set of relevant connecting verbs from comprehensive list, such as verbs that occur over a predetermined amount (e.g., 20 occurrences) while ignoring non-relevant verbs such as "is." Training data collection system 330 then extracts documents segments (e.g., sentences, phrases, etc.) from documents 300 that include the entity types and one of the relevant connecting verbs. The extracted document segments are stored in training data store 340 as relational training data 335.

Annotation system 350, in one embodiment, then assigns training annotations to the documents segments based on their content. For example, a user may use annotation system 350 to evaluate a document segment and determine whether it corresponds to a valid relation or an invalid relation, and provide either a 'yes' training annotation or a 'no' training annotation accordingly. In turn, the annotated training data is used to train relation-based classifier 360, such as one utilized in a relation extraction system.

In one embodiment, training data collection system 330 may be utilized for purposes other than collecting relational training data. For example, features of training data collection system 330 may be used as an event detection notification service, such as to detecting entities trending in an anomalous fashion and sending out alerts based on the verb connecting the entities. In another example, features of training data collection system 330 may be used in a temporal question-answering system to answer questions such as "What companies were acquired yesterday?" or "Show me the basketball teams that lost last night."

FIG. 4 is a graph depicting a temporal anomaly of multi-entity co-occurrences within a set of documents. During evaluation, training data collection system 330 logs the amount of times that multiple entities co-occur within time-based documents. Graph 400 shows the amount as multi-entity co-occurrences 410 over time.

Multi-entity co-occurrences 410 exceed predetermined co-occurrence threshold 430 during a time period (e.g., two days), referred to herein as anomaly duration 430. In response to detecting temporal anomaly 420, training data collection system 330 proceeds to check documents corresponding to anomaly duration 420 for a title that includes connecting verbs to confirm that the documents corresponding to anomaly duration 420 are a viable source for which to collect relational training data (see FIG. 5 and corresponding text for further details).

Figure 5:
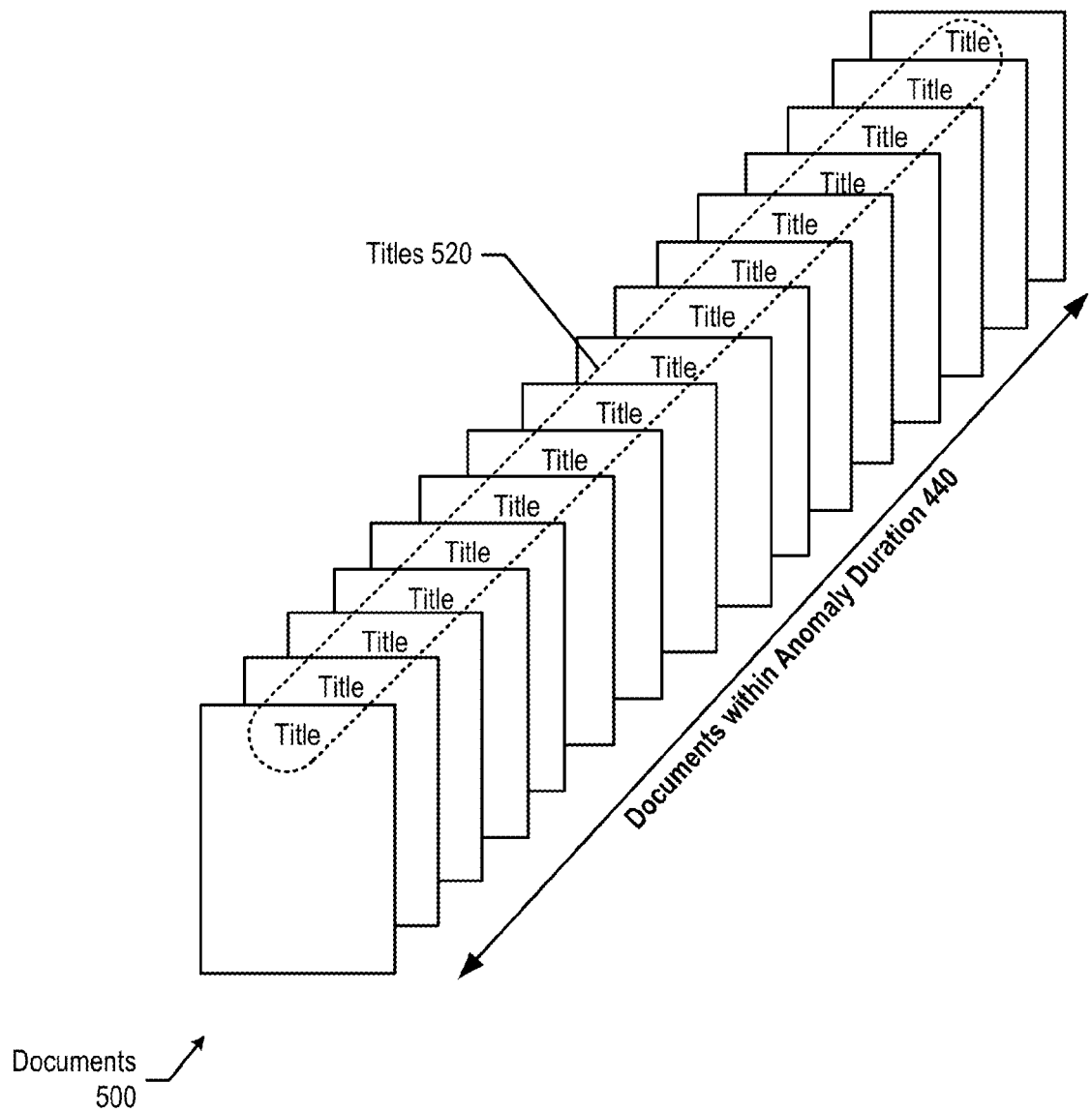
FIG. 5 is a diagram depicting a set of documents corresponding to an anomaly duration of multi-entity co-occurrences.

FIG. 5 is a diagram depicting a set of documents corresponding to an anomaly duration of multi-entity co-occurrences. As discussed herein, when a temporal anomaly 420 is detected and an anomaly duration 440 is determined, the titles 520 of documents 500 corresponding to anomaly duration 440 are searched for verbs that connect the entities in a subject-verb-object manner (e.g., company ABC acquired company DEF). Training data collection system 330 performs this step to confirm that the anomaly duration, in fact, includes documents of a multi-entity co-occurrence temporal anomaly. For example, training data collection system 330 may identify three of documents 500 that include a connecting verb, which indicates that each of documents 500 are suitable to collect relational training data (see FIG. 6 and corresponding text for further details).

Figure 6:
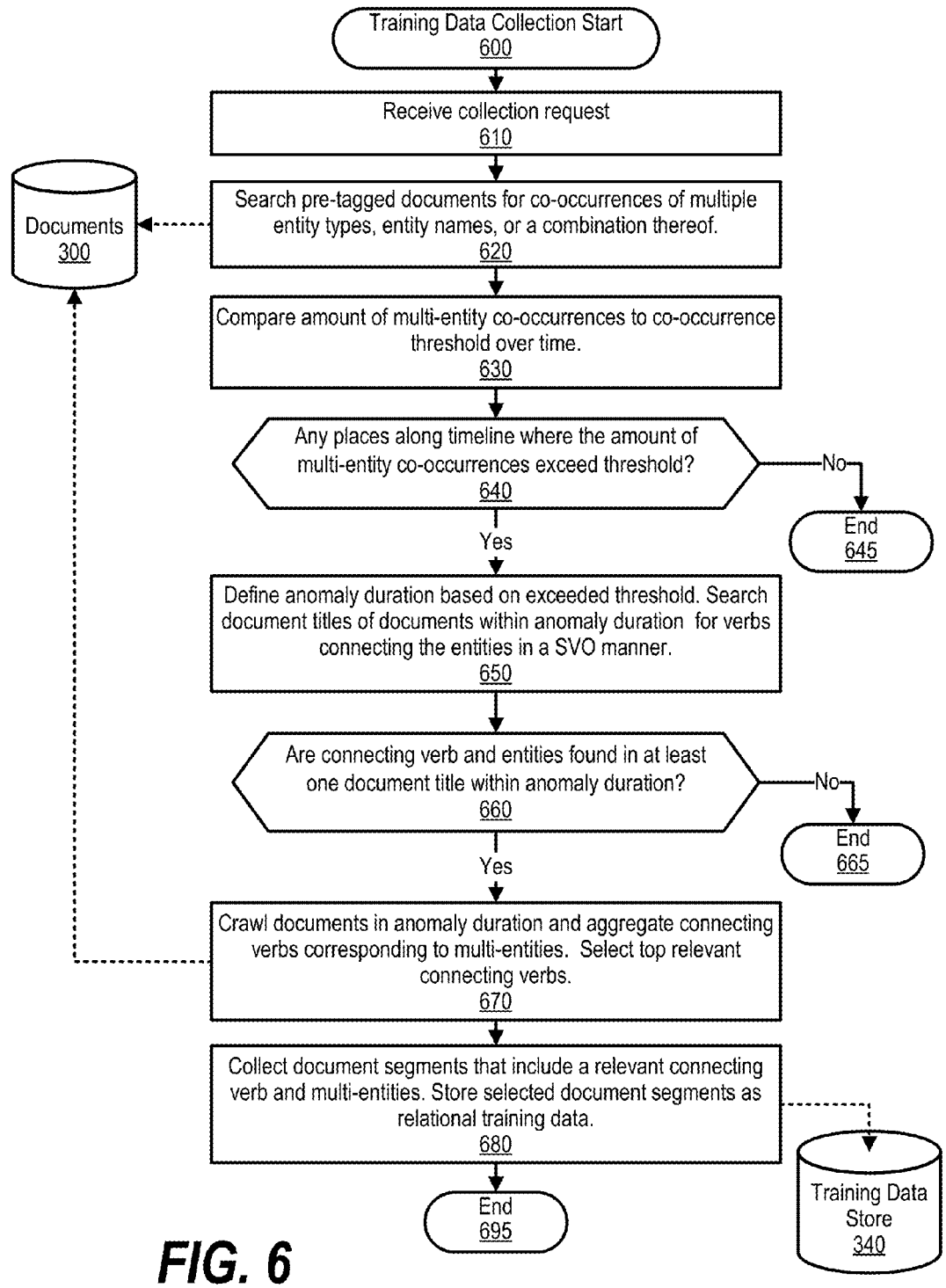
FIG. 6 is a flowchart depicting steps taken to identify and collect relational training data from a set of documents.

FIG. 6 is a flowchart depicting steps taken to identify and collect relational training data from a set of documents. FIG. 6 processing commences at 600 whereupon, at step 610, the process receives a collection request to collect relational training data, such as from a user. In one embodiment, the collection request is a request to find any two or more entities that occur in an anomalous manner. For example, the process may identify anomalies of a company name and a manufacturing plant. In another embodiment, the collection request may include specific entity types for which to search, such as "company" and "company." In yet another embodiment, the collection request may include specific entity names for which to search, such as "Company ABC" and "Company DEF." In yet another embodiment, the collection request may include a combination of the above embodiments.

At step 620, the process searches documents in documents store 300 for co-occurrences of multiple entities corresponding to the collection request. In one embodiment, the documents are news articles with a temporal component. At step 630, the process compares the amount of identified multi-entity co-occurrences to a co-occurrence threshold. FIG. 4 shows that multi-entity co-occurrences 410 exceeds co-occurrence threshold 430. In one embodiment, the process may have identified an anomaly of two entity types co-occurring, but may have not determined their corresponding entity names. For example, the process may have identified an anomaly of two "company" entity types but has not determined their corresponding company names.

The process determines as to whether any times at which the amount of multi-entity co-occurrences exceed the co-occurrence threshold (decision 640). If any places along the timeline where the amount of multi-entity co-occurrences did not exceed the co-occurrence threshold, then decision 640 branches to the 'no' branch and FIG. 6 processing thereafter ends at 645. On the other hand, if any places along the timeline where the amount of multi-entity co-occurrences exceeded the co-occurrence threshold, then a temporal anomaly is suspected and decision 640 branches to the 'yes' branch.

At step 650, the process performs steps to confirm the temporal anomaly. The process defines an anomaly duration based on the time at which the amount of multi-entity co-occurrences exceeded the threshold (e.g., two days). The process then searches document titles of documents within the anomaly duration for verbs that connect one or more entities in an SVO manner. For example, the process may identify a title such as "Company ABC acquires Company DEF." In one embodiment, the process may evaluate titles based on entity types, entity names, or a combination thereof.

The process determines as to whether any document title includes a connecting verb and corresponding entity types in an SVO relation (decision 660). If not, then decision 660 branches to the 'no' branch and FIG. 6 processing thereafter ends at 665. On the other hand, if the process found at least one title that includes a connecting verb and corresponding entity types in an SVO relation, decision 660 branches to the 'yes' branch.

At step 670, the process crawls the documents within the anomaly duration (not just those having a title with a connecting verb) and aggregates connecting verbs corresponding to the multi-entities. The process then selects the top relevant connecting verbs. For example, the aggregation may result in the following verbs and corresponding amounts:

acquire: 143
buy: 60
is: 54
purchase: 31
absorb: 6

In the above example, the process may set a minimum amount of times that a connecting verb should occur (e.g., 15) and also ignore non-relevant verbs (e.g., "is"). In this example, the process selects acquire, buy, and purchase from the above aggregation as relevant connecting verbs.

At step 680, the process collects, from the documents, document segments that include a relevant connecting verb that connects the multi-entities. The process then stores the collected document segments as relational training data in training data store 340. The relational training data is subsequently utilized to train a relation-based classifier for relation detection (see FIG. 7 and corresponding text for further details). FIG. 6 processing thereafter ends at 695.

Figure 7:
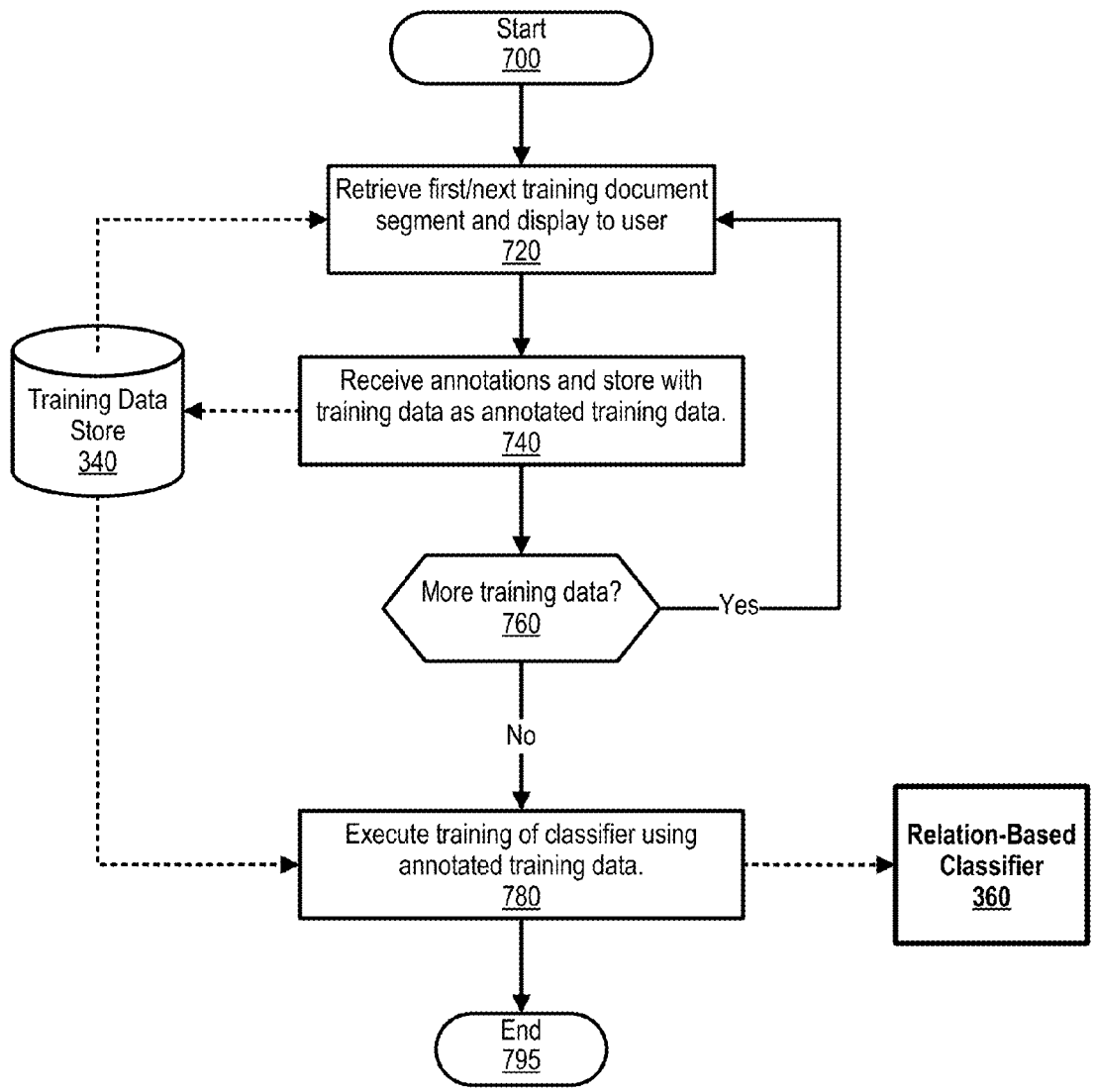
FIG. 7 is a flowchart depicting steps taken to annotate relational training data and use the annotated relational training data to train a relation-based classifier.

FIG. 7 is a flowchart depicting steps taken to annotate relational training data and use the annotated relational training data to train a relation-based classifier. Processing commences at 700 whereupon, at step 720, the process retrieves a first document segment from training data store 340. The process receives a training annotation (e.g., yes, no, etc.) for the document segment based on its validity discussed earlier, and stores the training annotation with the training document segment in training data store 340. For example, a user may evaluate a document segment and determine that the document segment includes a valid SVO relation. As such, the user may provide a 'yes' annotation for the document segment.

The process determines whether there are more relational training data (document segments) to evaluate (decision 760). If there are more document segments to evaluate, decision 760 branches to the 'yes' branch, which loops back to retrieve and annotate the next document segment. This looping continues until there are no more document segments to evaluate, at which point decision 760 branches to the 'no' branch.

At step 780, the process trains relation-based classifier 360 using the annotated training data. In one embodiment, during the training process, the process may train logistic regression models of the classifier by generating a "hyperplane" that separates "yes" answers from "no" answers. FIG. 7 processing thereafter ends at 795.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
   identifying an amount of instances of a first entity and a second entity co-occurring within a set of documents, wherein the set of documents correspond to a time duration;
   determining whether the amount of instances exceeds a threshold;
   in response to determining that the amount of instances exceeds the threshold, identifying at least one title, corresponding to the set of documents, that comprises the first entity, the second entity, and at least one connecting verb that grammatically connects the first entity to the second entity;
   in response to identifying the at least one title that comprises the first entity, the second entity, and at least one connecting verb, identifying a plurality of connecting verbs within the set of documents that each grammatically connects the first entity to the second entity, wherein the at least one connecting verb is included in the plurality of connecting verbs;
   in response to identifying the plurality of connecting verbs, selecting a plurality of document segments within the set of documents that comprise the first entity, the second entity, and at least one of the plurality of connecting verbs;
   storing the selected plurality of document segments in the memory; and
   training a relation-based classifier using the stored plurality of document segments.

2. The method of claim 1 wherein the first entity is a first entity type and the second entity is a second entity type, and wherein both the first entity and the second entity are devoid of an entity name.

3. The method of claim 1 further comprising:
   wherein each of the set of documents include a time stamp within the time duration.

4. The method of claim 1 further comprising:
   selecting a set of relevant connecting verbs, from the plurality of connecting verbs, based upon an amount of each of the plurality of connecting verbs and their relevance; and performing the collection of the plurality of document segments based upon the set of relevant connecting verbs.

5. The method of claim 4 wherein each of the plurality of connecting verbs form a subject-verb-object (SVO) relation with the first entity and the second entity.

6. The method of claim 1 wherein the information handling system is a question answer system, the method further comprising:
generating an alert in response to determining that the amount of instances exceeds the threshold, wherein the alert includes the first entity, the second entity, and the at least one connecting verb.

7. The method of claim 1 wherein the first entity and the second entity are selected from the group consisting of an entity type and an entity name.

8. An information handling system comprising:
one or more processors;
a memory coupled to at least one of the processors; and
a set of computer program instructions stored in the memory and executed by at least one of the processors in order to perform actions of:
identifying an amount of instances of a first entity and a second entity co-occurring within a set of documents, wherein the set of documents correspond to a time duration;
determining whether the amount of instances exceeds a threshold;
in response to determining that the amount of instances exceeds the threshold, identifying at least one title, corresponding to the set of documents, that comprises the first entity, the second entity, and at least one connecting verb that grammatically connects the first entity to the second entity;
in response to identifying the at least one title that comprises the first entity, the second entity, and at least one connecting verb, identifying a plurality of connecting verbs within the set of documents that each grammatically connects the first entity to the second entity, wherein the at least one connecting verb is included in the plurality of connecting verbs;
in response to identifying the plurality of connecting verbs, selecting a plurality of document segments within the set of documents that comprise the first entity, the second entity, and at least one of the plurality of connecting verbs;
storing the selected plurality of document segments in the memory; and
training a relation-based classifier using the stored plurality of document segments.

9. The information handling system of claim 8 wherein the first entity is a first entity type and the second entity is a second entity type, and wherein both the first entity and the second entity are devoid of an entity name.

10. The information handling system of claim 8 wherein at least one of the one or more processors perform additional actions comprising:
wherein each of the set of documents include a time stamp within the time duration.

11. The information handling system of claim 8 wherein at least one of the one or more processors perform additional actions comprising:
selecting a set of relevant connecting verbs, from the plurality of connecting verbs, based upon an amount of each of the plurality of connecting verbs and their relevance; and performing the collection of the plurality of document segments based upon the set of relevant connecting verbs.

12. The information handling system of claim 11 wherein each of the plurality of connecting verbs form a subject-verb-object (SVO) relation with the first entity and the second entity.

13. The information handling system of claim 8 wherein the information handling system is a question answer system, and wherein at least one of the one or more processors perform additional actions comprising:
generating an alert in response to determining that the amount of instances exceeds the threshold, wherein the alert includes the first entity, the second entity, and the at least one connecting verb.

14. The information handling system of claim 8 wherein the first entity and the second entity are selected from the group consisting of an entity type and an entity name.

15. A computer program product stored in a computer readable storage medium, comprising computer program code that, when executed by an information handling system, causes the information handling system to perform actions comprising:
identifying an amount of instances of a first entity and a second entity co-occurring within a set of documents, wherein the set of documents correspond to a time duration;
determining whether the amount of instances exceeds a threshold;
in response to determining that the amount of instances exceeds the threshold, identifying at least one title, corresponding to the set of documents, that comprises the first entity, the second entity, and at least one connecting verb that grammatically connects the first entity to the second entity;
in response to identifying the at least one title that comprises the first entity, the second entity, and at least one connecting verb, identifying a plurality of connecting verbs within the set of documents that each grammatically connects the first entity to the second entity, wherein the at least one connecting verb is included in the plurality of connecting verbs;
in response to identifying the plurality of connecting verbs, selecting a plurality of document segments within the set of documents that comprise the first entity, the second entity, and at least one of the plurality of connecting verbs;
storing the selected plurality of document segments in the memory; and
training a relation-based classifier using the stored plurality of document segments.

16. The computer program product of claim 15 wherein the first entity is a first entity type and the second entity is a second entity type, and wherein both the first entity and the second entity are devoid of an entity name.

17. The computer program product of claim 15 wherein the information handling system performs additional actions comprising:
wherein each of the set of documents include a time stamp within the time duration.

18. The computer program product of claim 15 wherein the information handling system performs additional actions comprising:
selecting a set of relevant connecting verbs, from the plurality of connecting verbs, based upon an amount of each of the plurality of connecting verbs and their relevance; and performing the collection of the plurality of document segments based upon the set of relevant connecting verbs.

19. The computer program product of claim 18 wherein each of the plurality of connecting verbs form a subject-verb-object (SVO) relation with the first entity and the second entity.

20. The computer program product of claim 15 wherein the information handling system is a question answer system, and wherein the information handling system performs additional actions comprising:
  generating an alert in response to determining that the amount of instances exceeds the threshold, wherein the alert includes the first entity, the second entity, and the at least one connecting verb.

* * * * *